US012759336B2

(12) United States Patent
Arai et al.

(10) Patent No.: US 12,759,336 B2
(45) Date of Patent: Oct. 13, 2026

(54) PENCIL LEAD

(71) Applicant: MITSUBISHI PENCIL COMPANY, LIMITED, Shinagawa-ku (JP)

(72) Inventors: Hiroyuki Arai, Fujioka (JP); Ryota Kubo, Fujioka (JP); Masaaki Matsumoto, Fujioka (JP)

(73) Assignee: MITSUBISHI PENCIL COMPANY, LIMITED, Shinagawa-ku (JP)

( * ) Notice: Subject to any disclaimer, the term of this patent is extended or adjusted under 35 U.S.C. 154(b) by 694 days.

(21) Appl. No.: 18/248,803

(22) PCT Filed: Oct. 5, 2021

(86) PCT No.: PCT/JP2021/036803

§ 371 (c)(1),
(2) Date: Apr. 12, 2023

(87) PCT Pub. No.: WO2022/080188

PCT Pub. Date: Apr. 21, 2022

(65) Prior Publication Data

US 2023/0398808 A1 Dec. 14, 2023

(30) Foreign Application Priority Data

Oct. 14, 2020 (JP) ................................ 2020-173511

(51) Int. Cl.
*B43K 19/02* (2006.01)
*C09D 13/00* (2006.01)

(52) U.S. Cl.
CPC .............. *B43K 19/02* (2013.01); *C09D 13/00* (2013.01)

(58) Field of Classification Search
CPC ................................ B43K 19/02; C09D 13/00
See application file for complete search history.

(56) References Cited

FOREIGN PATENT DOCUMENTS

| | | | | |
|---|---|---|---|---|
| JP | 60-105598 | A | | 6/1985 |
| JP | 3-31377 | A | | 2/1991 |
| JP | 4-252281 | A | | 9/1992 |
| JP | 5-271604 | A | | 10/1993 |
| JP | 2001-240789 | A | | 9/2001 |
| JP | 2002179975 | A | * | 6/2002 |
| JP | 2005187682 | A | * | 7/2005 |
| JP | 2005-31 4620 | A | | 11/2005 |
| JP | 2006124581 | A | * | 5/2006 |
| JP | 2007-31589 | A | | 2/2007 |
| JP | 2007031589 | A | * | 2/2007 |

OTHER PUBLICATIONS

English machine translation of JP-2006124581-A (Year: 2006).*
English machine translation of JP-2007031589-A (Year: 2007).*
English machine translation of JP-2002179975-A (Year: 2002).*
“2-Ethylhexyl Palmitate.” ChemicalBook, Oct. 29, 2011 (Year: 2011).*
English machine translation of JP-2005187682-A (Year: 2005).*
International Search Report mailed on Dec. 14, 2021 in PCT/JP2021/036803 filed on Oct. 5, 2021 (2 pages).

* cited by examiner

*Primary Examiner* — Amber R Orlando
*Assistant Examiner* — Jeffrey Eugene Barzach
(74) *Attorney, Agent, or Firm* — Oblon, McClelland, Maier & Neustadt, L.L.P.

(57) ABSTRACT

A pencil lead may achieve high levels of both improved density and improved fixability of a hand-drawn line and also be less likely to stain a hand during writing. Examples of this pencil lead include a pencil lead comprising a black porous fired lead body including at least graphite, wherein at least a compound selected from octyldodecyl erucate, oleyl oleate, octyldodecyl oleate, isopropyl palmitate, 2-ethylhexyl palmitate, and propylene glycol monooleate is impregnated in pores of the porous fired lead body. The pores of the black porous fired lead body are preferably impregnated with at least one selected from a terpene phenolic resin, a rosin ester resin, a ketone resin, and a rosin-modified phenolic resin, in addition to the compound.

20 Claims, No Drawings

PENCIL LEAD

CROSS-REFERENCE TO RELATED APPLICATIONS

The present application is the national stage of international application PCT/JP2021/036803, filed on Oct. 5, 2021, and claims the benefit of the filing date of Japanese Appl. No. 2020-173511, filed on Oct. 14, 2020.

TECHNICAL FIELD

The present specification relates to a pencil lead that can achieve both improved density and improved fixability in a drawn line and is also less likely to cause a stain on a hand or the like during writing.

BACKGROUND ART

As an ordinary fired pencil lead includes graphite as a colorant, the a-b plane of graphite covers the paper surface. The a-b plane reflects light, causing the drawn line to be less discernible. Thus, various attempts have been made to improve the density of a drawn line of a pencil lead.

To improve the density of a drawn line, a large amount of graphite serving as a colorant needs to be transferred to a writing surface. One of the properties that may act opposite to the density improvement is fixability (smear resistance of a drawn line against rubbing). That is, it can be said that the more density of a drawn line is improved, the less fixability is given; conversely, the more fixability is improved, the less density of a drawn line is given.

Thus, in the field of pencil leads, dedicated studies have been conducted to achieve these performances both.

For example, it is known that the reflection density of the drawn line and the fixability of the drawn line is investigated for the fired pencil lead that is formed by impregnating pores of a fired lead body with an oily substance that is solid at ordinary temperature, such as silicone oil, and an oily substance that is liquid at ordinary temperature and immiscible with the solid oily substance (e.g. See Patent Document 1). In this investigation, "good fixability" means that smear caused by rubbing is reduced from an estimated level of higher than 20% to a level between 10% and 20%, which is not sufficient.

It is also known that a pencil lead obtained by impregnating pores formed by firing with an impregnating component, in which fine pores of the fired pencil lead are impregnated with the impregnating component which are a silicone oil or the like and an organic substance having 14 to 50 carbons ($C_{14}$ to $C_{50}$) and a polar group, shall achieve both high-density lines and fixability of the drawn line (e.g., see Patent Document 2). Also in this case, "good fixability" is still worse and means that smear caused by rubbing is reduced from an estimated level of higher than 20% to approximately 20%, which is much less sufficient.

Furthermore, a "lead core" with high strength, high density, and excellent fixability to a drafting film is disclosed. It includes: a sintered body including boron nitride and carbon; and an adhesive material filled in pores of the sintered body, in which a peel strength between the adhesive material and a drafting film to be written on is 50 g/2.5 cm or greater, and the adhesive material (an adhesive wax or a mixture of a wax and a resin) is contained in fine pores of a fired lead (e.g., see Patent Document 3). This "lead core" is excellent in fixability to a drafting film but is considered to have too strong an adhesion to a paper surface.

Further, a pencil lead with both improved density and fixability to a paper surface is disclosed. It includes: a fired lead body containing dispersed graphite; and an oily substance, with which pores of the fired lead body are impregnated. As at least a part of the oily substance, a homogeneous mixture of a wax and a rosin-based resin and/or a petroleum resin is impregnated (e.g., see Patent Document 4). However, the "improved fixability" mentioned here is to reduce the smear caused by rubbing to approximately 10% by estimation and is considered insufficient.

The present applicant discloses a pencil lead obtained by impregnating pores of a white or monochromatic porous fired lead with a specific pigment, jojoba oil, and the like and thus the pencil lead having excellent color development, drawn line density, feel of drawing, light resistance, and mechanical strength (e.g., see Patent Document 5). In this pencil lead, graphite is not used, and fixability to a paper surface is not disclosed or considered.

CITATION LIST

Patent Document

Patent Document 1: JP H05-271604 A (Description, Examples, etc.)

Patent Document 2: JP 2005-314620 A (Claims, Description, etc.)

Patent Document 3: JP S60-105598 A (Description, Examples, etc.)

Patent Document 4: JP H03-031377 A (Claims, Description, etc.)

Patent Document 5: JP 2002-179975 A (Claims, Description, etc.)

SUMMARY OF INVENTION

Technical Problem

In view of the above problems and the like, the present disclosure is to solve them, and an object of the present disclosure is to provide a pencil lead that can achieve high levels of both improved density and improved fixability of a hand-drawn line and is also less likely to cause a stain on a hand or the like during writing.

Solution to Problem

In view of the above problems and the like to solve the problems, the present inventors have found that the intended pencil lead can be obtained by impregnating pores of a black porous fired lead body containing at least graphite with a specific oil component and the like, and completed the present disclosure.

That is, a pencil lead of the present disclosure is a pencil lead, in which a porous fired lead body includes at least graphite and which is black. The pores of the porous fired lead body are impregnated with at least a compound selected from a group consisting of octyldodecyl erucate, oleyl oleate, octyldodecyl oleate, isopropyl palmitate, 2-ethylhexyl palmitate, and propylene glycol monooleate.

The pores of the black porous fired lead body are preferably impregnated with Jojoba oil, which is a mixture containing octyldodecyl erucate described above.

In addition to the compound or jojoba oil, the pores of the black porous fired lead body is preferably impregnated with at least one selected from a group consisting of a terpene phenolic resin, a rosin ester resin, a ketone resin, and a rosin-modified phenolic resin.

The compound or jojoba oil is preferably contained in an amount of 60 mass % or higher in the impregnate oil.

Advantageous Effects of Invention

According to the present disclosure, there is provided the pencil lead that can achieve high levels of both improved density and improved fixability of a drawn line and a smear on a hand or the like is also less likely to occur during writing.

The object and effects of the present disclosure can be recognized and obtained especially by using the components and combination indicated in the claims. Both general explanation described above and detailed explanation described below are exemplary and explanatory and do not limit the present disclosure described in Claims.

DESCRIPTION OF EMBODIMENTS

Embodiments of the present disclosure will be described in detail below. However, note that the technical scope of the present disclosure is not limited to the embodiments described below and includes the invention described in Claims and equivalents thereof.

A pencil lead of the present disclosure is a pencil lead, which comprises a porous fired lead body includes at least graphite and is black, and pores of the porous fired lead body are impregnated with at least a compound selected from octyldodecyl erucate, isopropyl palmitate, octyldodecyl oleate, oleyl oleate, 2-ethylhexyl palmitate, and propylene glycol monooleate.

In the present disclosure, the black porous fired lead body containing at least graphite can be obtained by blending materials using a manufacturing method that have been used in the art, and the like. As long as the porous fired lead body contains at least graphite and is black, the type of blending material and the manufacturing method are not particularly limited.

For example, when the pencil lead is used for a mechanical pencil, the black porous fired lead body preferably contains at least graphite as a blending material. When the black porous fired lead body is used for a black porous fired lead body other than a mechanical pencil, it preferably contains at least graphite, a filler, a ceramic binder, and the like.

In the porous fired lead body for a mechanical pencil, an additional component can be used. Examples of the additional component include poly(vinyl chloride), poly(vinyl alcohol), a phenolic resin, pitch, cellulose, or polyacrylonitrile as a binder; a metal nanoparticle with a mean particle size of 100 nm or less, a diamond nanoparticle, or a coated nanoparticle obtained by coating a base material made of these nanoparticles and/or the like with amorphous carbon, graphite, diamond, a ceramic material, and the like as a nanoparticle; a carbon particle, such as fullerene; Ca—Zn stearate, sodium stearate, or magnesium stearate as a stabilizer; or dioctyl phthalate, dioctyl adipate, or diisobutyl phthalate as a plasticizer. In the fired pencil lead, an additional component can be used, such as a colorant, a lubricant, a binder component, a silicone oil of various types, lard, an acrylic resin, an epoxy resin, a celluloid, another thermoplastic resin, and an organic solvent.

Examples of the graphite that can be used include natural graphite, such as flaky natural graphite; artificial graphite; kish graphite; expandable graphite, and expanded graphite.

Examples of the ceramic binder include crystalline or amorphous $SiO_2$, $Si_3N_4$, $Al_2O_3$, ZrO, MgO, boron nitride, $B_2O_3$, and AlN. These may be each used alone or in combination of two or more.

The mean particle size in the present disclosure (including examples described later) refers to a volume mean particle size (mv value) which is volume-weighted from a measurement result in a laser diffraction/scattering method. For example, the mean particle size of nanoparticles can be measured using a Nanotrac [UPA-EX150 (internal probe type) available from Nikkiso Co., Ltd.].

Any filler that has been used in pencil leads in the art can be used without particular limitation. For example, a white filler, such as boron nitride, kaolin, talc, mica, or calcium carbonate, can be used, and a color filler can also be used depending on the hue of the pencil lead. As a matter of course, a mixture of several of these fillers can also be used. In particular, the filler is preferably boron nitride, kaolin, or talc because of the physical properties and form.

Any binder component that has been used in pencil leads in the art can be used without particular limitation. Examples include celluloses, such as carboxylmethyl cellulose; polyvinyls, such as polyvinylpyrrolidone; polyethers, such as poly(oxyethylene); acrylic acids, such as poly(acrylic acid); inorganic polymers, such as tetraethyl orthosilicate (TEOS) condensate, clays, such as montmorillonite, and ceramic glass. These can be used individually, or a mixture of two or more types can be used.

In addition, examples of the thermoplastic resin include poly(vinyl alcohol), poly(vinyl chloride), poly(chlorinated vinyl chloride), polyamide, polyethylene, polypropylene, and poly(ether ether ketone).

The organic solvent used is preferably a solvent that becomes a plasticizer to dissolve the thermoplastic resin. Specifically, dioctyl phthalate, dibutyl phthalate, tricresyl phosphate, dioctyl adipate, diallyl isophthalate, propylene carbonate, an alcohol, a ketone, or an ester, can be used.

In the present disclosure, the fired pencil lead body can be obtained by kneading components used for a fired pencil lead for a mechanical pencil or for a fired pencil lead for other than a mechanical pencil (graphite, carbon black, a nanoparticle, a filler, a surfactant, a perfume, a thermoplastic resin, an organic solvent, and/or the like), molding, drying, and firing under a non-oxidizing atmosphere.

For example, in manufacturing a pencil lead for a mechanical pencil, from the viewpoints of strength, density, and feel of writing, the pencil lead can be preferably manufactured by using (a) 30 to 70 mass % of the graphite and carbon black and (b) 0.01 to 1 mass % of nanoparticle relative to a total amount of a pencil lead blending composition; dispersing and mixing additional components (c) 30 to 60% of a thermoplastic synthetic resin and (d) 0 to 30% of an organic solvent capable of dissolving the thermoplastic synthetic resin with a Henschel mixer; kneading the mixture in a pressure kneader or two rolls; molding with an extruder; then drying in an electric furnace at 110 to 250° C. to form a lead body for forming a pencil lead before firing; and firing the lead body under an atmosphere of an inert gas, such as nitrogen, at 800 to 1400° C. for 20 to 40 hours.

In the present disclosure, as described above, the intended pencil lead can be obtained by impregnating pores of the black porous fired lead body containing at least graphite, obtained from blending materials by a manufacturing method that have been used, with at least a compound selected from octyldodecyl erucate, isopropyl palmitate, octyldodecyl oleate, oleyl oleate, 2-ethylhexyl palmitate, and propylene glycol monooleate.

Preferably, the pores of a black porous fired lead can be impregnated with Jojoba oil, which is a mixture containing octyldodecyl erucate. The jojoba oil used in the present disclosure is a vegetable oil extracted from seeds of jojoba (Simmondsia chinensis) by pressing or the like. Jojoba oil is a linear long-chain ester (liquid wax) mainly containing octyldodecyl erucate and has strong resistance to oxidation and high stability unlike common vegetable oils. A purified oil, deodorized oil, hydrogenated oil, and the like obtained from a pressed oil can be used, and commercially available products if available can be used.

A (total) content of at least one selected from the above compounds (including jojoba oil) is preferably 60 mass % or higher, and more preferably 80 to 100 mass % in an impregnating oil from the viewpoint of exhibiting the effects of the present invention.

Subjecting octyldodecyl erucate described above, jojoba oil, which is a mixture containing octyldodecyl erucate described above, isopropyl palmitate, octyldodecyl oleate, oleyl oleate, 2-ethylhexyl palmitate, or propylene glycol monooleate to treatment, of impregnation into pores of the black porous fired lead body described above, provides a pencil lead that can achieve unprecedentedly high levels of both improved density and improved fixability of a drawn line and is also less likely to smear a hand or the like during writing, compared with a traditional oil, such as a dimethyl silicone oil.

In the present disclosure, in addition to at least one type selected from the compounds (including jojoba oil), at least one type selected from a terpene phenolic resin, a rosin ester resin, a ketone resin, and a rosin-modified phenolic resin is preferably used in combination, from the viewpoint of further improving the effects of the present disclosure, particularly from the viewpoint of improving the fixability, and the like.

The terpene phenolic resin that can be used is a copolymer obtained by cationic polymerization of a terpene compound and a phenol in the presence of a Friedel-Crafts catalyst.

The terpene compound is typically a polymer of isoprene ($C_5H_8$) and is classified into a monoterpene ($C_{10}H_{16}$), a sesquiterpene ($C_{15}H_{24}$), a diterpene ($C_{20}H_{32}$), and the like, and is a compound having these as basic skeletons. Among these, in the present disclosure, a monoterpene, a sesquiterpene, or a diterpene is preferably used, and a sesquiterpene or a monoterpene is more preferably used. Examples of these terpene compounds include myrcene, allo-ocimene, ocimene, α-pinene, β-pinene, dipentene, limonene, α-phellandrene, α-terpinene, γ-terpinene, terpinolene, 1,8-cineole, 1,4-cineole, α-terpineol, β-terpineol, γ-terpineol, camphene, tricyclene, sabinene, para-menthadienes, and carenes. Among these, α-pinene, β-pinene, limonene, myrcene, allo-ocimene, or α-terpinene is preferred.

Examples of the phenols include phenol, cresol, xylenol, propylphenol, nolylphenol, hydroquinone, resorcin, methoxyphenol, bromophenol, bisphenol A, and bisphenol F. Among these, phenol or cresol is preferred.

The terpene phenolic resin is a kind of what is called tackifier (tack-adding resin) and is generally considered to be an amorphous oligomer with a molecular weight of several hundreds to several thousands. Examples of terpene-based resins other than the terpene phenolic resins include terpene resins, aromatic-modified terpene resins, and hydrogenated terpene resins. In the present disclosure, the terpene phenolic resin may include a hydrogenated terpene phenolic resin obtained by hydrogenation of a terpene phenolic resin.

In the present disclosure, commercially available terpene phenolic resins can be used if available. For example, they are commercially available under the trade names of Polyester series and Mighty Ace series from Yasuhara Chemical Co., Ltd. and can be easily obtained. Specific examples include YS Polystar T30, YS Polystar T80, and YS Polystar T160 (all above available from Yasuhara Chemical Co., Ltd.).

The rosin ester resin used in the present disclosure is a resin obtained by esterification with an alcohol, of a rosin resin, a disproportionated rosin resin and a hydrogenated rosin resin containing abietic acid as a main component, a dimer (polymerized rosin resin) of a resin acid, such as abietic acid, or the like. As some hydroxyl groups of the alcohol used for the esterification are not used for the esterification and contained in the resin, the hydroxyl value is adjusted to the above range. Examples of the alcohol include polyhydric alcohols, such as ethylene glycol, glycerin, and pentaerythritol.

Note that a resin a rosin resin is esterified to a rosin ester resin, a disproportionated rosin resin is esterified to a disproportionated rosin ester resin, a hydrogenated rosin resin is esterified to a hydrogenated rosin ester resin, and a polymerized rosin resin is esterified to a polymerized rosin ester resin. Any of these can be used in the present disclosure.

Examples of the rosin ester resin include Estergum HP available from Arakawa Chemical Industries, Ltd. and Haritack F85 available from Harima Chemicals, Inc.

For the ketone resin that can be used, a commercially available product can be used, and examples include Ketone Resin K-90 (available from Arakawa Chemical Industries, Ltd.).

Examples of the rosin-modified phenolic resin that can be used include the following. Examples include a rosin-modified phenolic resin obtained by: dissolving a p-alkylphenol, such as p-octylphenol or p-nonylphenol, paraformaldehyde, and rosin in toluene; reacting the solution in the presence of an acid or an alkaline catalyst; melting glycerin, pentaerythritol, or rosin at 200° C.; adding a resol resin to react; and then esterifying with glycerin. Other examples include a rosin-modified phenolic resin obtained by adding a resol resin to a glycerin ester of rosin and reacting; or a rosin-modified phenolic resin obtained by reacting a rosin-modified alkyd resin with a phenolic resin. Examples of a commercially available product include Tamanol 135, Tamanol 350, and Tamanol 354 available from Arakawa Chemical Industries, Ltd.

In the present disclosure, the intended pencil lead is obtained by impregnating pores of the black porous fired lead body containing at least graphite described above with at least one selected from the compounds (including jojoba oil) as an impregnate component. Preferably, in addition to at least one selected from the compounds (including jojoba oil), at least one selected from a terpene phenolic resin, a rosin ester resin, a ketone resin, and a rosin-modified phenolic resin (these are referred to as “group A”) is added as an impregnate component to provide a pencil lead that can achieve consistently higher levels of improved density and improved fixability of a drawn line. Also it provides a pencil lead less likely to cause a smear on a hand or the like during writing.

When at least one selected from a terpene phenolic resin, a rosin ester resin, a ketone resin, and a rosin-modified phenolic resin (group A) is used as an impregnate component in addition to at least one selected from the compounds (including jojoba oil), the (total) content of at least one selected from the compounds (including jojoba oil) described above is preferably 60 mass % or greater (40 mass % or less for group A) and more preferably 60 to 80 mass % (20 to 40 mass % for group A) in an impregnate oil from the viewpoints of feel of writing and wear loss.

In the present disclosure, the method of impregnating pores of the porous fired lead body of the constitution is not particularly limited. For example, it can be performed by immersing a black porous fired lead body containing at least graphite: in at least one selected from the compounds (including jojoba oil) (60 to 100 mass % of each compound) as it is; or in at least one selected from a terpene phenolic resin, a rosin ester resin, a ketone resin, and a rosin-modified phenolic resin (group A) in addition to the compound (including jojoba oil) (60 mass % or higher); or in a solution prepared by diluting these with a solvent, such as ethylene glycol, ethanol, 2-ethylhexanol, butyl cellusolve, dipropylene glycol monomethyl ether, isopropanol, or propylene glycol, sufficiently impregnating the pores using heat immersion, reduced pressure or increased pressure, if necessary, and then removing (drying) the solvent.

In the above impregnation treatment, a (total) amount of the compound (including jojoba oil), or the (total) amount of at least one selected from a terpene phenolic resin, a rosin ester resin, a ketone resin, and a rosin-modified phenolic resin (group A) in addition to the compound (including jojoba oil) with which pores of the black porous fired lead body containing at least graphite are impregnated is not particularly limited. The effects of the present disclosure can be sufficiently exhibited with an amount of preferably approximately 0.1 to 30 mass % and more preferably 0.5 to 25 mass % relative to the pencil lead body weight, while it may vary depending on the pencil type, porosity, and the like.

In the present disclosure, the pores of the black porous fired lead body containing at least graphite are impregnated with and contain at least the compound (including jojoba oil), or, in addition to at least the compound (including jojoba oil), the pores are impregnated with and contain at least one selected from a terpene phenolic resin, a rosin ester resin, a ketone resin, and a rosin-modified phenolic resin, which is a preferred embodiment. This allows the lead to easily penetrate and crumble when the lead wears, and facilitates the fixation of the worn powder on a paper surface, thus enabling dark handwriting on a smooth paper surface and the like. Thus, provided is a pencil lead that can achieve high levels of both improved density and improved fixability of a drawn line and is also less likely to cause smear on a hand or the like during writing because of the fixability superior to that of the pencil lead in the art.

Example 1

Next, the present disclosure will be described in further detail with reference to examples and comparative examples, but the present disclosure is not limited by the following examples and the like.

Example 1

A black porous fired lead body (fired pencil lead body) containing at least graphite was prepared by the following method.

- Flaky natural graphite 40 parts by mass
- Nanoparticle: diamond nanoparticle (particle size: my value 50 nm) 0.4 parts by mass
- Poly(vinyl chloride) 40 parts by mass
- Sodium stearate 1 part by mass
- Dioctyl phthalate 15 parts by mass The above nanoparticle and dioctyl phthalate were dispersed in a bead mill for 180 minutes, and the other materials above were mixed and dispersed in a Henschel mixer (mixing and dispersing time 20 minutes, the same hereinafter), kneaded in a pressure kneader and a roll, formed, and then dioctyl phthalate was dried. Then, the composite was fired at 1000° C. for 10 hours in a nitrogen ($N_2$) atmosphere, and a fired pencil lead body with a diameter of 0.565 mm and a length of 60 mm was produced. Then, this fired pencil lead body was immersed in a mixed oil of 70 mass % of jojoba oil (NIKKOL Jojoba Oil S, available from Nikko Chemicals Co., Ltd.) and 30 mass % of terpene phenolic resin A (YS Polystar T160, available from Yasuhara Chemical Co., Ltd.) and thus subjected to an impregnation treatment at 150° C. for 24 hours, and a pencil lead was produced. The impregnated amount in the lead body was determined to be 14.5 mass % relative to the lead body weight by gravimetry.

Examples 2 to 18 and Comparative Examples 1 to 5

The fired pencil lead body obtained in the Example 1 was immersed in a mixed oil or each compound (including jojoba oil) of blending composition shown in Table 1 below to be subjected to impregnation treatment in the same manner as in Example 1 above, and a pencil lead was produced. The impregnation amount in each lead body is shown in Table 1 below by gravimetry in the same manner as in the Example 1.

Each of pencil leads obtained in Examples 2 to 18 and Comparative Examples 1 to 5 was measured and evaluated for the density and fixability of the drawn line by each evaluation method below. These results are shown in Table 1 below.

Method for Evaluating Density of Drawn Line

The pencil lead was mounted into a mechanical pencil (M5-450 1P) available from Mitsubishi Pencil Co., Ltd., and the drawn line of the pencil lead was measured in the density test specified in JIS S 6005: 2007 with a densitometer (DENSITOMETER PDA65 available from Konica Minolta, Inc.), and evaluated by the following three-grade evaluation criteria (mean value, n=10).

Evaluation Criteria

A: equivalent to density of the same hardness

B: equivalent to density of hardness lower by half a grade

C: less than density of hardness lower by a grade

Method for Evaluating Fixability (Smear Resistance)

The pencil lead was mounted into a mechanical pencil (M5-450 1P) available from Mitsubishi Pencil Co., Ltd., and a line was drawn with the pencil lead in accordance with the density test specified in JIS S 6005: 2007. A felt was used to rub over the drawn line, in a direction orthogonal to the drawn direction, back and forth four times, where the felt was under the vertical load of 500 g. The portion of the spread smear of the drawn line was measured by a densitometer (DENSITOMETER PDA65 available from Konica Minolta, Inc.) and evaluated by the following four-grade evaluation criteria (mean value, n=10).

Evaluation Criteria

A: to produce less smear than a pencil lead of one higher degree of hardness
B: to produce equivalent smear to a pencil lead of about one higher degree of hardness
C: to produce equivalent smear to a pencil lead of about a half higher degree of hardness
D: to produce equivalent smear to a pencil lead of the same degree of hardness

TABLE 1

(Total amount: 100 mass %)

| | Examples 1 | 2 | 3 | 4 | 5 | 6 | 7 | 8 | 9 | 10 | 11 | 12 |
|---|---|---|---|---|---|---|---|---|---|---|---|---|
| Jojoba oil *1 | 70 | 60 | 60 | 60 | 60 | | | | | | | 100 |
| Oleyl oleate | | | | | | 70 | | | | | | |
| Octyldodecyl oleate | | | | | | | 70 | | | | | |
| Octyldodecyl erucate | | | | | | | | 70 | | | | |
| Isopropyl palmitate | | | | | | | | | 70 | | | |
| 2-Ethylhexyl palmitate | | | | | | | | | | 70 | | |
| Propylene glycol monooleate | | | | | | | | | | | 70 | |
| Octyldodecyl myristate | | | | | | | | | | | | |
| Stearyl stearate | | | | | | | | | | | | |
| Terpene phenolic resin A *2 | 30 | | | | | 30 | 30 | 30 | 30 | 30 | 30 | |
| Terpene phenolic resin B *3 | | 40 | | | | | | | | | | |
| Rosin-modified phenolic resin *4 | | | 40 | | | | | | | | | |
| Ketone resin *5 | | | | 40 | | | | | | | | |
| Rosin-modified phenolic resin *6 | | | | | 40 | | | | | | | |
| Dimethyl silicone oil *7 | | | | | | | | | | | | |
| Paraffin wax *8 | | | | | | | | | | | | |
| Poly-α-olefin *9 | | | | | | | | | | | | |
| Impregnation amount (mass %) | 14.5 | 14.2 | 14.1 | 14.6 | 14.8 | 14.5 | 14.2 | 14.3 | 14.5 | 14.3 | 14.2 | 14.6 |
| Density of hand-drawn line | A | A | A | A | A | A | A | A | A | A | A | A |
| Fixability (smear resistance) | A | A | A | A | A | A | A | A | A | A | A | B |

(Total amount: 100 mass %)

| | Examples | | | | | | Comparative Examples | | | | |
|---|---|---|---|---|---|---|---|---|---|---|---|
| | 13 | 14 | 15 | 16 | 17 | 18 | 1 | 2 | 3 | 4 | 5 |
| Jojoba oil *1 | | | | | | | | | | | |
| Oleyl oleate | 100 | | | | | | | | | | |
| Octyldodecyl oleate | | 100 | | | | | | | | | |
| Octyldodecyl erucate | | | 100 | | | | | | | | |
| Isopropyl palmitate | | | | 100 | | | | | | | |
| 2-Ethylhexyl palmitate | | | | | 100 | | | | | | |
| Propylene glycol monooleate | | | | | | 100 | | | | | |
| Octyldodecyl myristate | | | | | | | 100 | | | | |
| Stearyl stearate | | | | | | | | 100 | | | |
| Terpene phenolic resin A *2 | | | | | | | | | | 30 | |
| Terpene phenolic resin B *3 | | | | | | | | | | | |
| Rosin-modified phenolic resin *4 | | | | | | | | | | | |
| Ketone resin *5 | | | | | | | | | | | |
| Rosin-modified phenolic resin *6 | | | | | | | | | | | |
| Dimethyl silicone oil *7 | | | | | | | | | 100 | | |
| Paraffin wax *8 | | | | | | | | | | 70 | |
| Poly-α-olefin *9 | | | | | | | | | | | 100 |
| Impregnation amount (mass %) | 14.5 | 14.4 | 14.5 | 14.3 | 14.3 | 14.5 | 14.3 | 14.3 | 14.5 | 14.6 | 14.3 |
| Density of hand-drawn line | A | A | A | A | A | A | C | C | A | C | A |
| Fixability (smear resistance) | B | B | B | B | B | B | B | B | D | A | D |

In Table 1 above, *1 to *9 are specified as below.
*1: NIKKOL Jojoba Oil S (available from Nikko Chemicals Co., Ltd.)
*2: YS Polystar T160 (available from Yasuhara Chemical Co., Ltd.)
*3: YS Polystar T160 (available from Yasuhara Chemical Co., Ltd.)
*4: Estergum HP (available from Arakawa Chemical Industries, Ltd.)
*5: Ketone Resin K-90 (available from Arakawa Chemical Industries, Ltd.)

*6: Tamanol 135 (available from Arakawa Chemical Industries, Ltd.)
*7: KF96-30cs, available from Shin-Etsu Chemical Co., Ltd.
*8: Paraffin wax, available from Nippon Seiro Co., Ltd.
*9: PAO-4, available from Philips As is clear from the results in Table 1 above, the pencil leads of Examples 1 to 18, which are included in the scope of the present disclosure, were found to be pencil leads that can achieve high levels of both improved density and improved fixability of a drawn line and were also less likely to cause a smear on a hand or the like during writing compared with the pencil leads of Comparative Examples 1 to 5, which are not included in the scope of the present disclosure.

INDUSTRIAL APPLICABILITY

The pencil lead of the present disclosure can be suitably used for a wooden-shaft pencil lead, a mechanical pencil, and the like.

The invention claimed is:

1. A pencil lead, comprising:

a black porous fired lead body comprising graphite, wherein, impregnated in pores thereof, the porous fired lead body comprises (i) octyldodecyl erucate, oleyl oleate, octyldodecyl oleate, isopropyl palmitate, 2-ethylhexyl palmitate, and/or propylene glycol monooleate, and (ii) a terpene phenolic resin, a rosin ester resin, a ketone resin, and/or a rosin-modified phenolic resin.

2. The pencil lead of claim 1, wherein jojoba oil, which is a mixture containing the octyldodecyl erucate, is impregnated in the pores of the porous fired lead body.

3. The pencil lead of claim 2, wherein the jojoba oil is present in an amount of 60 mass % or greater in an oil impregnating the pores of the porous fired lead body.

4. The pencil lead of claim 1, wherein, impregnated in pores thereof, the porous fired lead body comprises the octyldodecyl erucate.

5. The pencil lead of claim 1, wherein, impregnated in pores thereof, the porous fired lead body comprises the oleyl oleate.

6. The pencil lead of claim 1, wherein, impregnated in pores thereof, the porous fired lead body comprises the octyldodecyl oleate.

7. The pencil lead of claim 1, wherein, impregnated in pores thereof, the porous fired lead body comprises the isopropyl palmitate.

8. The pencil lead of claim 1, wherein, impregnated in pores thereof, the porous fired lead body comprises the 2-ethylhexyl palmitate.

9. The pencil lead of claim 1, wherein, impregnated in pores thereof, the porous fired lead body comprises the propylene glycol monooleate.

10. The pencil lead of claim 1, wherein, impregnated in pores thereof, the porous fired lead body comprises at least two of octyldodecyl erucate, oleyl oleate, octyldodecyl oleate, isopropyl palmitate, 2-ethylhexyl palmitate, and propylene glycol monooleate.

11. The pencil lead of claim 1, wherein a content of the octyldodecyl erucate, oleyl oleate, octyldodecyl oleate, isopropyl palmitate, 2-ethylhexyl palmitate, and/or propylene glycol monooleate is 60 mass % or greater in an oil impregnating the pores of the porous fired lead body.

12. A pencil lead, comprising:

a black porous fired lead body comprising graphite, wherein the black porous fired lead body is impregnated with (I) a compound selected from a group consisting of octyldodecyl erucate, oleyl oleate, octyldodecyl oleate, isopropyl palmitate, 2-ethylhexyl palmitate, and propylene glycol monooleate, and (II) a resin selected from a group consisting of a terpene phenolic resin, a rosin ester resin, a ketone resin, and a rosin-modified phenolic resin.

13. The pencil lead of claim 12, wherein a content of the compound of (I) is 60 mass % or greater in an oil impregnating the pores of the porous fired lead body.

14. The pencil lead of claim 12, wherein the resin of (II) is the terpene phenolic resin.

15. The pencil lead of claim 12, wherein the resin of (II) is the rosin ester resin.

16. The pencil lead of claim 12, wherein the resin of (II) is the ketone resin.

17. The pencil lead of claim 12, wherein the resin of (II) is the rosin-modified phenolic resin.

18. The pencil lead of claim 12, wherein the compound of (I) is the octyldodecyl erucate.

19. The pencil lead of claim 12, wherein the compound of (I) is the isopropyl palmitate.

20. The pencil lead of claim 12, wherein the compound of (I) is the octyldodecyl oleate.

* * * * *